US007974246B1

(12) United States Patent
Fulthorp et al.

(10) Patent No.: US 7,974,246 B1
(45) Date of Patent: Jul. 5, 2011

(54) ADAPTIVE TIME DIVISION MULTIPLE ACCESS SYSTEMS AND METHODS

(75) Inventors: Richard J. Fulthorp, Renton, WA (US); John F. Cleveland, Edmonds, WA (US); Peter D. Donich, Houston, TX (US); Thomas G. Donich, Seeley Lake, MT (US); Norman R. Shivley, Edmonds, WA (US); Wipawee "Pam" Siriwongpairat, Kent, WA (US); Dale K. Smith, Renton, WA (US); Robert L. Turnbull, Covington, WA (US)

(73) Assignee: MeteorComm, LLC, Renton, WA (US)

( * ) Notice: Subject to any disclaimer, the term of this patent is extended or adjusted under 35 U.S.C. 154(b) by 900 days.

(21) Appl. No.: 11/985,809

(22) Filed: Nov. 16, 2007

Related U.S. Application Data

(60) Provisional application No. 60/859,596, filed on Nov. 17, 2006.

(51) Int. Cl.
*H04L 12/50* (2006.01)
(52) U.S. Cl. ........................................ 370/337; 370/445
(58) Field of Classification Search ........................ None
See application file for complete search history.

(56) References Cited

U.S. PATENT DOCUMENTS

| 3,628,147 | A | * | 12/1971 | Makino | 370/315 |
|---|---|---|---|---|---|
| 5,425,032 | A | * | 6/1995 | Shloss et al. | 370/346 |
| 5,598,417 | A | * | 1/1997 | Crisler et al. | 370/348 |
| 5,720,455 | A | * | 2/1998 | Kull et al. | 246/187 C |
| 5,721,725 | A | * | 2/1998 | Want et al. | 370/236 |
| 5,721,732 | A | * | 2/1998 | Emeott et al. | 370/437 |
| 5,896,561 | A | * | 4/1999 | Schrader et al. | 455/67.11 |
| 6,026,083 | A | * | 2/2000 | Albrow et al. | 370/347 |
| 6,275,739 | B1 | * | 8/2001 | Ireland | 700/19 |
| 6,484,030 | B1 | * | 11/2002 | Antoine et al. | 455/444 |
| 6,545,996 | B1 | * | 4/2003 | Falco et al. | 370/347 |
| 6,711,144 | B1 | * | 3/2004 | Kim et al. | 370/335 |
| 6,760,308 | B1 | * | 7/2004 | Ghanma et al. | 370/235 |
| 6,778,557 | B1 | * | 8/2004 | Yuki et al. | 370/468 |
| 7,305,009 | B2 | * | 12/2007 | Gaskill | 370/470 |
| 7,388,849 | B2 | * | 6/2008 | Kim et al. | 370/329 |
| 7,523,215 | B1 | * | 4/2009 | Robinson et al. | 709/236 |
| 7,546,135 | B2 | * | 6/2009 | Janky et al. | 455/520 |
| 7,639,663 | B1 | * | 12/2009 | Nerses et al. | 370/347 |
| 7,664,130 | B2 | * | 2/2010 | Sakoda et al. | 370/442 |
| 7,719,981 | B2 | * | 5/2010 | Ghanma et al. | 370/235 |
| 7,729,321 | B2 | * | 6/2010 | Liu | 370/337 |
| 7,729,372 | B2 | * | 6/2010 | Yonge et al. | 370/442 |
| 7,738,608 | B2 | * | 6/2010 | Feher | 375/347 |
| 7,808,892 | B1 | * | 10/2010 | Babcock et al. | 370/219 |
| 7,813,373 | B2 | * | 10/2010 | Joshi et al. | 370/458 |
| 7,822,059 | B2 | * | 10/2010 | Katar et al. | 370/442 |
| 7,826,818 | B2 | * | 11/2010 | Gollnick et al. | 455/343.4 |
| 2002/0071413 | A1 | * | 6/2002 | Choi | 370/337 |
| 2003/0078006 | A1 | * | 4/2003 | Mahany | 455/63 |
| 2003/0137986 | A1 | * | 7/2003 | Kaku et al. | 370/449 |
| 2003/0223387 | A1 | * | 12/2003 | Davenport et al. | 370/328 |
| 2004/0156342 | A1 | * | 8/2004 | Amouris | 370/336 |
| 2004/0208243 | A1 | * | 10/2004 | Feher | 375/232 |
| 2004/0240411 | A1 | * | 12/2004 | Suzuki | 370/331 |

(Continued)

*Primary Examiner* — Bunjob Jaroenchonwanit
(74) *Attorney, Agent, or Firm* — Thompson & Knight LLP; James J. Murphy

(57) ABSTRACT

A method for exchanging information within a radio communications system includes establishing communications between radio systems utilizing a carrier sense multiple access mode during a period of lower traffic load on the radio communications system and establishing communications between the radio systems utilizing a time division multiple access mode during a period of higher traffic load on the radio communications system.

20 Claims, 12 Drawing Sheets

U.S. PATENT DOCUMENTS

| | | | |
|---|---|---|---|
| 2005/0180453 A1* | 8/2005 | Gaskill | 370/465 |
| 2006/0167784 A1* | 7/2006 | Hoffberg | 705/37 |
| 2006/0209746 A1* | 9/2006 | Asai et al. | 370/328 |
| 2007/0025383 A1* | 2/2007 | Katar et al. | 370/442 |
| 2007/0072560 A1* | 3/2007 | Ishikawa | 455/101 |
| 2007/0076745 A1* | 4/2007 | Manjeshwar et al. | 370/448 |
| 2007/0195798 A1* | 8/2007 | Peng et al. | 370/400 |
| 2007/0229270 A1* | 10/2007 | Rofougaran | 340/572.1 |
| 2007/0230497 A1* | 10/2007 | Choi et al. | 370/442 |
| 2009/0310571 A1* | 12/2009 | Matischek et al. | 370/336 |

* cited by examiner

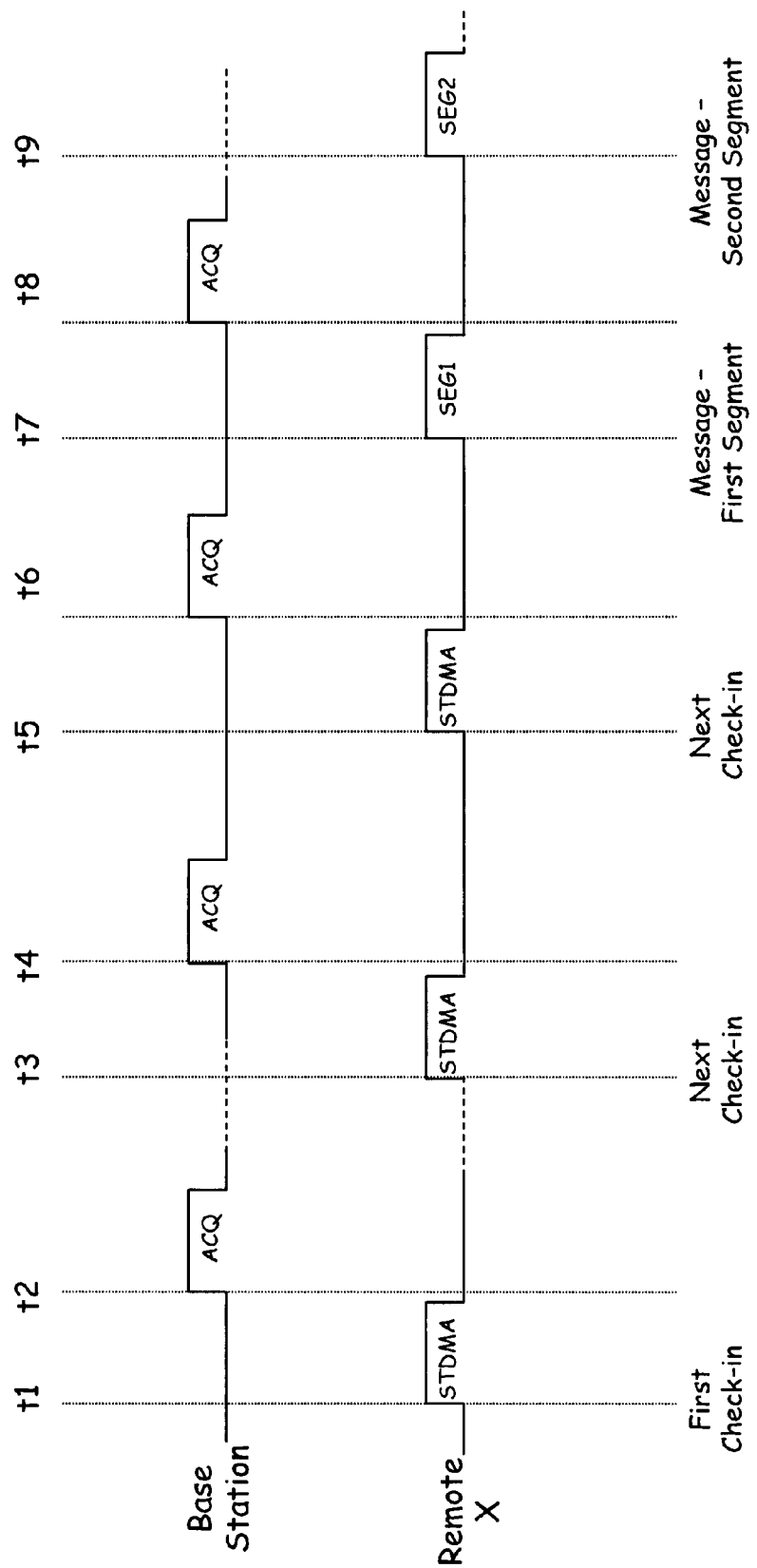

FIG. 3F

| POS Report Interval In Seconds | POSS Report Interval In Seconds | SEGB Total Number Of Segments | SEGP Total Number Of Segments | WSP1 Polling Interval In Seconds | WSP1 Number Of Waysides | WSP2 Polling Interval In Seconds | WSP2 Number Of Waysides | WSP3 Polling Interval In Seconds | WSP3 Number Of Waysides | WSP4 Polling Interval In Seconds | WSP4 Number Of Waysides |
|---|---|---|---|---|---|---|---|---|---|---|---|

US 7,974,246 B1

ADAPTIVE TIME DIVISION MULTIPLE ACCESS SYSTEMS AND METHODS

CROSS-REFERENCE TO RELATED APPLICATION

The present application claims the benefit of U.S. Provisional Patent Application Ser. No. 60/859,596, filed Nov. 17, 2006.

FIELD OF INVENTION

The present invention relates in general to radio communications techniques, and in particular to adaptive time division multiple access systems and methods.

BACKGROUND OF INVENTION

In any transportation industry, reliable communications systems are mandatory for avoiding serious, if not catastrophic, accidents. In the particular case of the railroads, the railroad central offices normally communicate through wired telecommunications links with a network of radio base stations, which are typically dispersed over very large geographical areas. The radio base stations in turn maintain wireless communication links with locomotives, service vehicles, and wayside systems operating within the base station coverage areas.

In designing and operating a communications system for a transportation industry, a number of different constraints must be addressed. In the railroad industry, for example, a reliable and efficient communications system must be capable of handling different types of information, including data transmitted from the railroad central office and wayside systems to the locomotive on-board computers, as well as voice transmissions between train crews and the central office. In addition, any wireless communications system must conform with the restrictions imposed on it by the Federal Communications Commission (FCC), for example, those related to frequency band allocation, channel width and spacing, and so on. Finally, any commercially viable communications system should be adaptable to meet new needs and challenges as they arise.

SUMMARY OF INVENTION

The principles of the present invention are embodied in systems and methods for optimizing communications in radio communications systems, for example those used by railroads. According to one representative embodiment, a method is disclosed for exchanging information within a radio communications system in which communications between radio systems are established utilizing a carrier sense multiple access (CSMA) mode during a period of lower traffic load on the radio communications system and are established utilizing a time division multiple access mode (TDMA) during a period of higher traffic load on the radio communications system.

Advantageously, the CSMA mode minimizes latency when a small number of radios systems are operating on a relatively random basis. The TDMA mode increases efficiency and minimizes collisions when a larger number of radios are operating and/or when periodic communications are required. Furthermore, the TDMA mode increases efficiency when different types of information (e.g. data and voice) must be integrated into the transmission scheme.

BRIEF DESCRIPTION OF DRAWINGS

For a more complete understanding of the present invention, and the advantages thereof, reference is now made to the following descriptions taken in conjunction with the accompanying drawings, in which:

FIG. 3A is a timing diagram illustrating a small number of cycles of a system operating in a carrier sense multiple access (CSMA) mode according to the inventive principles;

FIG. 3F is a diagram illustrating representative information found in a status (STDMA) message sent from a remote radio system to a base station to indicate the type of messages within the remote radio system transmit queue (TXQ);

DETAILED DESCRIPTION OF THE INVENTION

Figure 1:
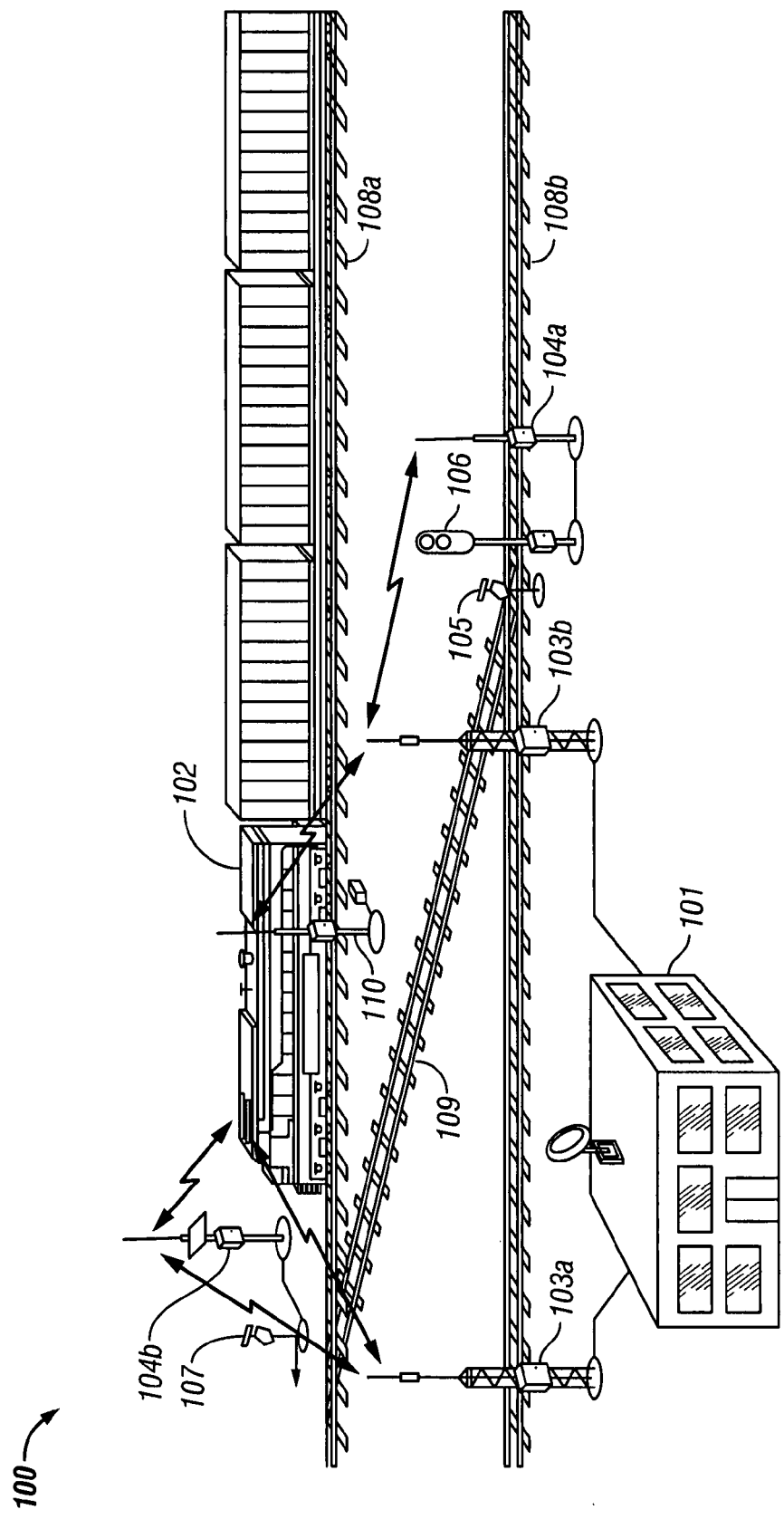
FIG. 1 is a high level block diagram of a small portion of a representative communications system utilized in the railroad industry and suitable for describing a typical application of the present inventive principles.

The principles of the present invention and their advantages are best understood by referring to the illustrated embodiment depicted in FIGS. 1-3 of the drawings, in which like numbers designate like parts.

FIG. 1 is high level diagram showing a small portion of a railroad communications system 100 embodying the principles of the present invention. Generally, system 100 supports wireless communications between a central office (network operating center) 101 and locomotives 102 located at various points around a rail system, as well as direct communications between locomotives 102 and the electronic wayside monitoring subsystems, discussed below in detail.

In communications system 100, central office 101 communicates with packet radios on locomotives 102 through a wired telecommunications network and a series of packet radio base stations dispersed over thousands of square miles of geographical area through which the rail system operates. In the diagram of FIG. 1, two radio base stations 103a and 103b are shown for discussion purposes.

Communications system 100 also includes a series of wayside monitoring subsystems, which monitor wayside systems such as signals, switches, and track circuits and communicate the monitored information directly to locomotives 102 within the corresponding wireless coverage area, as well as to central office 101 though base stations 103. FIG. 1 shows two representative wayside monitoring subsystems 104a and 104b. As examples of typical uses of wayside monitoring subsystems 104, wayside monitoring subsystem 104a is shown monitoring a switch 105 and a three-lamp signal 106, and wayside monitoring subsystem 104b is shown monitoring a hand-throw switch 109. Also for illustrative purposes, two parallel sections of track 108a and 108b and a connecting section 109 are shown in FIG. 1, which represent only a very small part of the overall track system.

Communications system 100 also includes a hotbox monitoring subsystem 110 which uses rail-side sensors to allow central office 101 to monitor the axle status of passing trains through packet data radios and wireless base stations 103. In particular, railcar wheels, brakes, and trucks can be monitored for stuck brakes or overheated bearings, such that trains can be slowed or stopped before a catastrophic failure occurs.

Figure 2A:
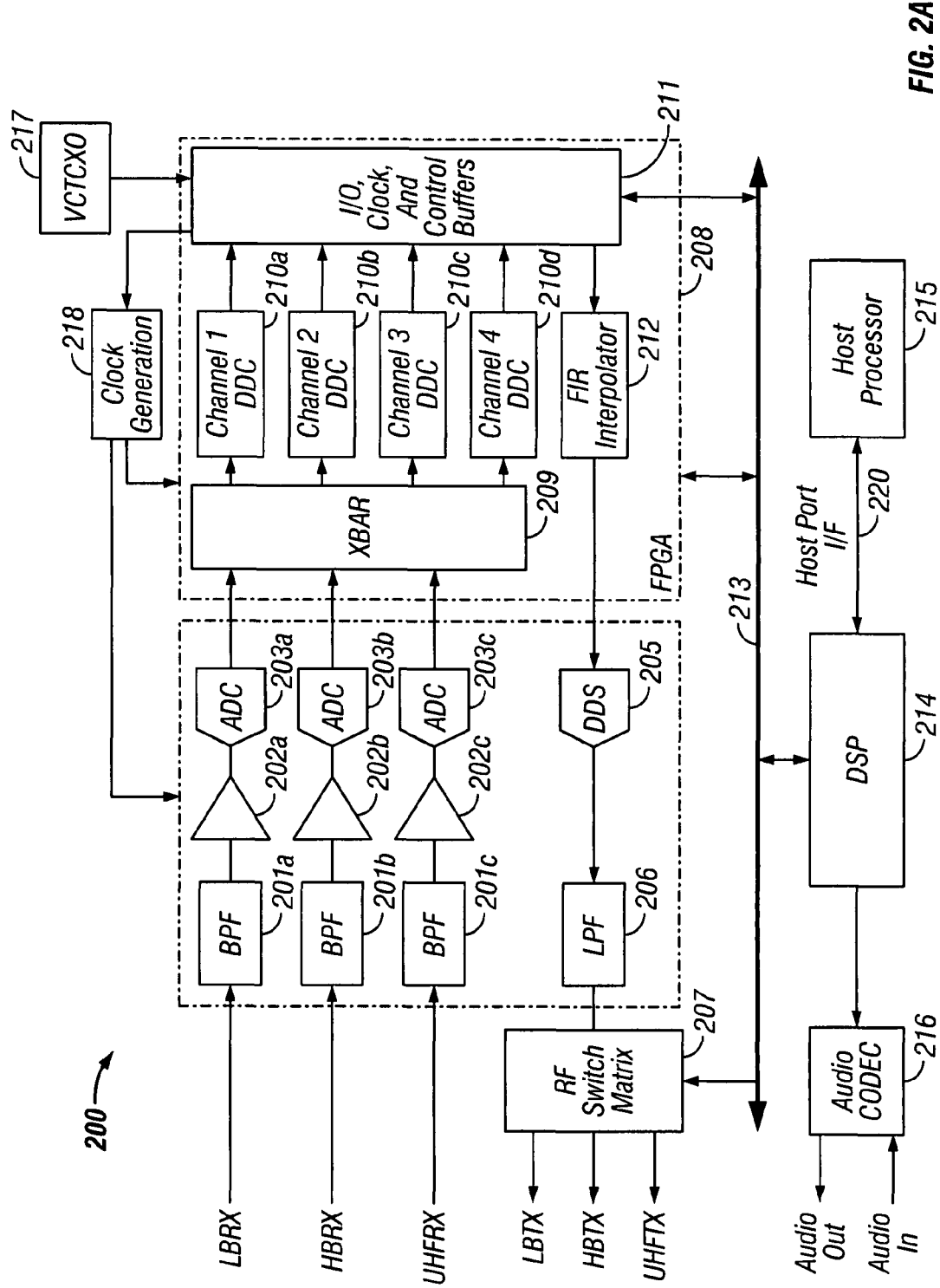
FIG. 2 is a block diagram of the primary operational blocks of a representative multiple-channel software defined radio (SDR) suitable for implementing the principles of the present invention.

FIG. 2A is a block diagram of a multiple-channel software defined radio (SDR) embodying the principles of the present invention. Among other things, SDR 200 realizes the significant advantage of allowing multiple information (voice and data) channels to be simultaneously received on multiple radio frequency (RF) input bands and then simultaneously demodulated using multiple parallel data processing paths. Particularly advantageous is the fact that these data channels can have different frequencies, channel spacing, modulation types, and bit rates. In other words, SDR 200 performs multiple simultaneous receive operations typically requiring a corresponding number of single-channel receivers. Furthermore, SDR 200 also supports simplex data transmission on a selected transmission channel and RF frequency band.

SDR 200 is suitable for use in a wide range of radio communications applications requiring the simultaneous or near simultaneous exchange of multiple channels of information in multiple formats, such as digital data and voice. In exemplary system 100 of FIG. 1, SDR radio 200 may be used in base stations 103, locomotives 102, and wayside monitoring subsystems 104.

In the illustrated embodiment, SDR 200 receives and transmits data on three (3) RF frequency bands. The receive bands include the low receive (LBRX) band (approximately 39-50 MHz), the high receive (HBRX) band (approximately 151-163 MHz), and the ultra high frequency receive (UHFRX) band (approximately 935-940 MHz). The high receive (HBRX) band may be partitioned into receive sub-bands, for example, two sub-bands of approximately 151-156 MHz and approximately 156-163 MHz.

The transmit bands include the low transmit (Lux) band (approximately 39-50 MHz), the high transmit (HBTX) band (approximately 151-163 MHz), and the ultra high frequency transmit (UHFTX) band (approximately 896-940 MHz). The high transmit (HBTX) band may be partitioned into transmit sub-bands, for example, two sub-bands of approximately 151-156 MHz and approximately 156-162 MHz. The high frequency transmit (UHFTX) band may also be partitioned into sub-bands, for example, two sub-bands of approximately 896-901 MHz and approximately 935-940 MHz.

In alternate embodiments, the number of RF receive and transmit bands, as well as the corresponding frequencies, may differ depending on the particular design or application.

As shown in FIG. 2A, the receive bands (LBRX, HBRX, UHFRX) are each provided with an independent hardware path including an analog bandpass filter (BPF) 201a-201c, an intermediate frequency (IF) amplifier 202a-202c, and an analog to digital converter (ADC) 203a-203c. In the illustrated embodiment, BPFs 201a-201c have a passband of approximately 39-90 MHz, IF amplifiers 202a-202c provide approximately 21 dB of gain with bypass, and ADCs 203a-203c operate at a sampling rate of 57.6 Msps and have an output resolution of sixteen (16) bits. (Front end modules [not shown] perform low-noise amplification and down-convert signals received on the HBRX and the UHFRX bands into the 39-90 MHz IF bands at the inputs to BPFs 201b and 201c). Filters 201a-201c reduce spurious noise generated elsewhere in the system and suppress energy that would otherwise be sampled outside the first two (2) Nyquist zones. IF amplifiers 202a-202c improve the noise figure at the inputs to ADCs 203a-203c. The particular receive hardware parameters may change based on the specific design and application of SDR 200.

The RF transmit path includes a direct data synthesizer (DDS) 204, which performs digital to analog conversion, and an analog lowpass filter (LPF) 206. In the illustrated embodiment, LPF 206 has a corner frequency of approximately 90 MHz and passes signals in the 39-90 MHz IF band to an RF switch matrix 207. RF switch matrix 207 switches the IF signals to corresponding transmit modules (not shown), which generate the ultimate RF signals within the appropriate RF transmit band (LBTX, HBTX, UHFTX).

According to the principles of the present invention, SDR 200 is based upon a field programmable gate array (FPGA) 208, which may be, for example, an Altera EP2C35 FPGA. Generally, FPGA 208 and accompanying firmware act as a multi-channel receiver tuner and transmit modulator interpolator. FPGA 208 implements, for example, signal routing, channel turning, frequency down conversion, gain control, and CORDIC rotation (Cartesian to polar conversion) independently and simultaneously on multiple input channels.

As shown in FIG. 2A, FPGA 208 implements a cross-bar switch 209, which routes up to four (4) input channels provided by the three (3) receive paths. The four (4) channels of data are processed by four (4) corresponding direct data converters (DDCs) 210a-210d, which will be discussed in detail in further conjunction with FIG. 2B. Any or all of the four (4) DDCs 210a-210b can be routed to any one of the three (3) sampled RF receive bands (LBRX, HBRX, UHFRX). The simultaneous processed channels can be made up of data channels, voice channels, or a combination of voice and data. Additionally, each channel can be set for different channel frequency and spacing, modulation type, and bit rate, for example, 9600 bps GMSK data in a 12.5 kHz channel, voice in a 25 kHz channel, 19200 bps GMSK data in a third 25 kHz channel, and 9600 bps C4FM data in a 6.25 kHz fourth channel.

The DDC output vectors from each DDC 210a-210d include Cartesian (I and Q), along with magnitude, phase, and instantaneous frequency, which support data and voice demodulators to operating on polar data. The outputs from DDDs 210a-210d are stored in registers within I/O, Clock, and Control Buffers circuit block 211, also implemented within FPGA 208. For the transmit path of SDR 200 (buffers), FPGA 208 implements a finite impulse response (FIR) interpolator 211.

FPGA 208 operates in conjunction with a bus 213 and digital signal processor 214. In the illustrated embodiment, DSP 214 is a Texas Instruments TMS320C5510 DSP, which supports multiple channel demodulation operations, as defined in firmware. DSP 214 also runs digital signal coding for forward error correction (FEC) and privacy, and can support digital voice decoding using commercially available vocoder firmware applications. Advantageously, SDR 200 redistributes the computational load between FPGA 208 and DSP 214 such that a large portion of the high speed DSP processing typically found in existing radio receivers, for example CORDIC rotation and frequency differentiation, is now implemented in FPGA 208.

A direct memory access (DMA) system implemented with DSP 214 enables the transfer and buffering of blocks of data samples between buffers within buffers block 211 and the DSP memory space. For example, when a prescribed block length of receive data processed by a DDC 210a-210d has been collected within buffer, DSP 214 retrieves those data blocks using DMA and performs the balance of the data or voice demodulation tasks. DSP 214 then outputs from one (1) to four (4) user data streams to host processor 215 via host port interface 220 or one (1) voice channel to an audio codec 216 and one (1) to three (3) data channels to host processor 215.

Host processor 215 downloads the boot code configuring FPGA 206 and DSP 214. Advantageously, boot downloading can be performed before or after field deployment of SDR 200, and allows field code upgrades to both the DSP and the host operating systems.

A voltage controlled temperature compensated crystal oscillator (VCTCXO) 217 establishes the time base for the circuitry of SDR 200. In the illustrated embodiment, VCTXO 217 generates a 19.2 MHz clock signal, which is level shifted and buffered within FPGA 208 and then provided to DSP 214 as the master clock (MILK) signal. This clock signal is also provided as a reference signal to clock generation circuitry 218. Clock generation circuitry 218 includes a 921.6 MHz frequency synthesizer, for example a National Semiconductor LMX2531 frequency synthesizer, along with frequency dividers and level shifters. Clock generation circuitry 218 provides a set of clock signals, and in particular, a 57.6 MHz clock signal for driving ADCs 203a-203c, as well as the clock signals needed by and DDCs 210a-210d.

Figure 2B:
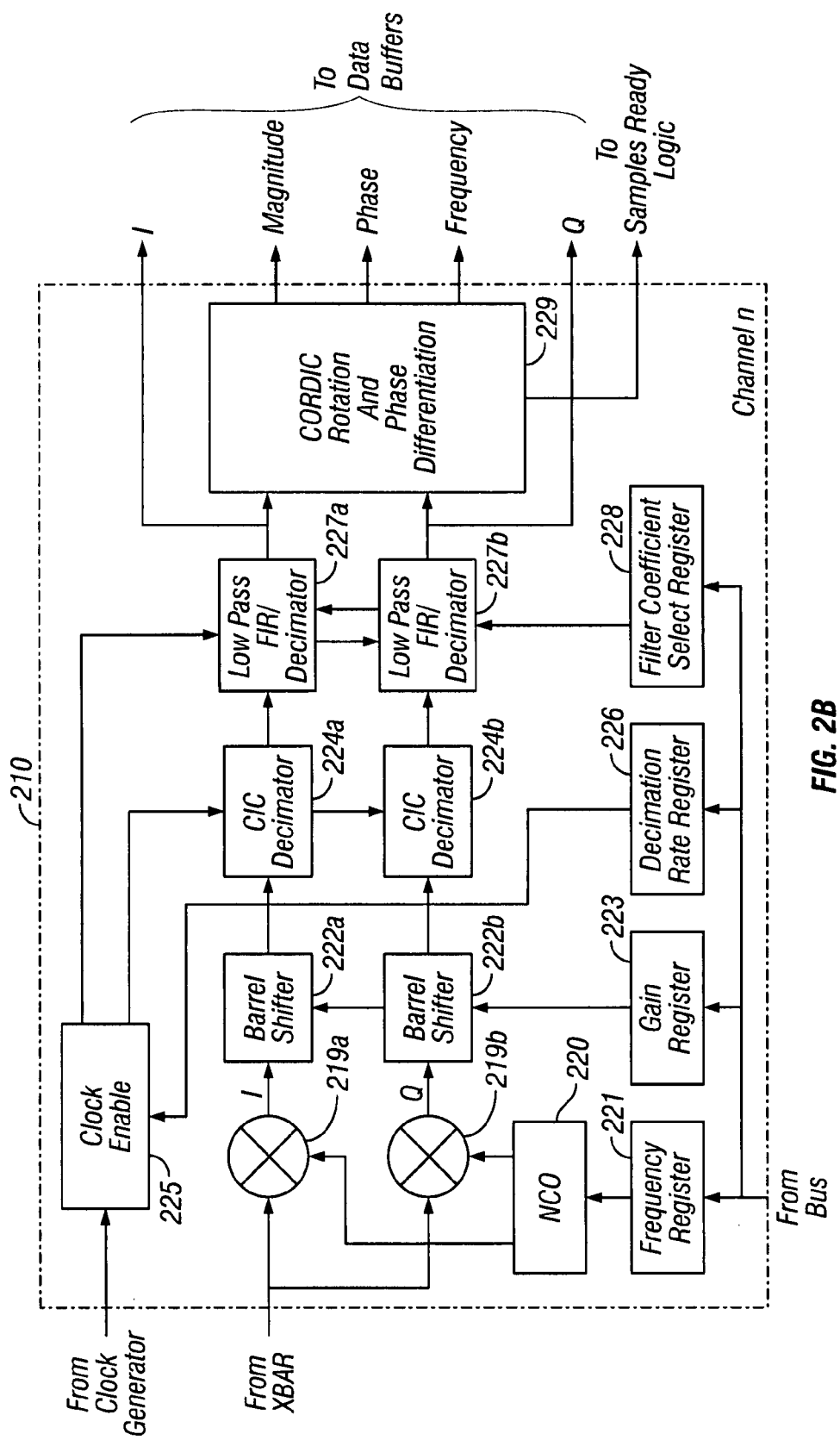

FIG. 2B is a more detailed block diagram of a selected one of DDCs 210a-210d of FPGA 208. As shown in FIG. 2B, digital mixers 219a and 219b, which are driven by numerically controlled digital oscillator (NCO) 220, generate in-phase (I) and quadrature (Q) signals from the input data received from crossbar switch 209. NCO oscillator is controlled by frequency control data loaded into frequency register 221. Frequency register 221, gain register 223, decimation rate register 226, and filter coefficient register 228 are loaded from bus 213 by DSP 214. In the illustrated embodiment, host 215 sends DSP 214 digital receive and transmit values in Hz, which are then validated and converted into appropriate numerical values, and then stored in the corresponding register. (In alternate embodiments, host 215 may directly the load registers within FPGA 208 using the DSP DMA system.)

The I and Q signals are shifted in barrel shifters 222a-222b, under the control of data stored within gain register 223. Generally, barrel shifters 222a-222b selectively shift the bits of each value output from the corresponding mixer 221a-221b to double the digital gain for each bit shifted (with sign bits maintained in their current states).

The I and Q signals are then filtered and decimated by corresponding cascaded integrator-comb (CIC) filters 224a-224b, under the control of clock enable signals generated by clock enable circuit block 225 and the data loaded into decimation rate register 226. In the preferred embodiment, where the input data stream is received at 57.6 Msps, CIC filters 224a-224b decimate by 1200 in response to 48 kHz clock enable signals.

After decimation, the I and Q data streams are lowpass filtered and further decimated by lowpass filters (LPFs) 227a and 227b, also enabled by clock enable block 221. The FIR filter coefficients are selected through filter coefficient select register 228. In the preferred embodiment, LPFs 227a and 227b are 200-tap FIR filters that implement a cutoff frequency of 6 kHz. The decimated and filtered I and Q samples are then sent to buffers within buffers block 211 of FIG. 2A for collection into blocks for use in signal demodulation by DSP 214.

Each DDC 210a-210d also includes CORDIC rotation and phase differentiation circuitry 229, which generates digital magnitude, phase, and instantaneous frequency information. This feature advantageously supports demodulation algorithms running on DSP 214 that utilize polar data.

The principles of the present invention are embodied in adaptive time division multiple access (ATDMA) systems and methods. Generally, these ATDMA systems and methods layer a time division multiple access (TDMA) protocol with a carrier sense multiple access (CSMA) protocol to maximize channel utilization efficiency. More particularly, bursts of TDMA service are provided, as needed, in a system generally operating under a CSMA channel protocol.

For purposes of discussion, a base station is a subsystem, such as railroad radio base station 103 of FIG. 1, which communicates with a set of neighboring remotes within its coverage area, such as the radios on locomotives 102 and within wayside subsystems 104, which collectively will be referred to as remotes 102/104. The term radio generally refers to any radio operating within the system, including the radio base stations 103 and the radios of remotes 102/104. (It should be noted that the ATDMA systems and methods described herein are not limited to railroad communications, but can be applied to a wide range of wireless communications applications.)

A CSMA protocol is most suitable when a small number of radios are operating on a channel and generally allows random traffic to be transmitted with short latency in light traffic load conditions. On the other hand, a TDMA protocol is more suitable for heavier traffic loads and/or when periodic communications are required. Additionally, TDMA protocols are also more efficient when different types of information (e.g. data and voice) must be integrated into the given communications system. For example, in a railroad application, voice packets between train crews and central office 101 must be integrated with data streams being transmitted between central office 101, the computers on locomotives 102, and/or wayside subsystems 104.

In the present discussion, the CSMA mode generally uses a three-step process. First, a transmitting node must detect silence on a channel and then acquire that channel for transmission. Second, the original transmitting node must control the channel such that information frames (i.e. RF Link frames) can be exchanged with one or more other nodes in the system. Third, when the exchange of information is complete, the original transmitting node must relinquish the channel.

Additionally, in the present CSMA mode, RF Link frames are either broadcast to all neighbor radios (i.e. a broadcast frame), or to specific, directly-addressed radios. Any radio that receives a broadcast frame processes the frame for message content or control information, but does not transmit a response. Any radio that receives a directly-addressed frame always responds to that frame with an immediate transmission.

In the present ATDMA mode, a radio base station 103 uses the CSMA mode to acquire a channel. In particular, the base station transmits directly-addressed frames to the neighboring remotes 102/104 in the coverage area. If no remote 102/104 responds, the base station 103 did not successfully acquire the channel and must wait a random time for a free channel and try again. Once the channel is acquired, the base station 103 sends ATDMA control frames that assign slots to the neighboring remotes 102/104 within the coverage area. The base station 103 then controls the channel as long as necessary to maintain the required data exchanges with the remotes 102/104. The base station 103 only relinquishes the channel if no remote 102/104 responds to directly-addressed frames, if its interleaving period with other base stations 103 has expired, or if there are no more remote 102/104 data requests requiring ATDMA control. After relinquishing the channel, the channel is freed for CSMA communications, until load conditions require a return to the ADTMA mode.

Each remote 102/104 starts in the CSMA mode and then periodically sends a transmit-queue-Status-TDMA (STDMA) message to the currently associated base station 103 when the number of messages within the remote 102/104 transmit queue is above a selected ATDMA lower threshold. In the illustrated embodiment, the STDMA messages indicate the type, priority, and quantity of each different type of message in the transmit queue. A STDMA message is also sent to a base station 103 the first time a remote 102/104 selects that base station as its master. (Messaging and base station selection are discussed in detail below.)

In each remote 102/104, outbound messages of all types are routed to a transmit queue in priority order. Message priority for a railroad communications system application is discussed in detail below.

All remotes 102/104 with any data in their transmit queues attempt to acquire a neighboring base station 103 using the competitive CSMA mode. Once a remote 102/104 has acquired the channel, it transmits as many messages as possible in a burst until link connection breaks. Once the connection breaks, the remote 102/104 repeatedly attempts to transmit in the CSMA mode until all messages are successfully sent to the base station 103. As messages are acknowledged by the base station, the transmit queue status updates, and changes are sent to the base station periodically as queues cross configurable change boundaries or empty.

Basic CSMA communications are illustrated in the timing diagram of FIG. 3A. After the random carrier sense time, at time t1, a remote 102/104, for example Remote X, starts up in CSMA mode with an empty transmit queue (TXQ), selects a base station, and sends an empty STDMA message to the selected base station 103. Assuming that the base station 103 has no outbound traffic, it sends an acknowledge (ACQ) frame at time t2, associates Remote X as a new neighbor, and adds Remote X to its TDMA schedule. Remote 102/104 checks-in periodically with the base station 103 by sending an SDTMA frame, for example, at time t3, which the base station acknowledges at time t4.

Now assume that Remote 102/104 1 has a message to be transmitted to base station 103. Remote X sends an STDMA message at time t5 to the base station 103 indicating its TXQ size. The base station 103 computes that this is not enough traffic to warrant switching to the TDMA mode and acknowledges the STDMA message as a normal segment at time t6, and adds the message size into the TDMA schedule. Remote X then uses normal CSMA message frames to send its message segments to the base station, starting at time t7. The base station 103 acknowledges each message segment received from Remote X and then decrements the TXQ size for Remote X 1 in its TDMA schedule.

Next, consider the ATDMA mode. The base station 103 determines, from all the STDMA messages received from all the associated remotes 102/104, whether the current traffic load requires shifting to the ATDMA mode. When a shift to ADTMA mode is required, an ATDMA schedule is generated, and slots are assigned to each remote 102/104 by the base station 103.

In particular, the base station 103 transmits, at time t6 in FIG. 3B, a First-TDMA (FTDMA) control frame to all remotes 102/104, which instructs each remote 102/104 to wait for its slot or slots to be announced by the base station 103 in the following ATDMA control frame. (Alternatively, the FDTMA control frame may include IDs to specific remotes 102/104, in which case the identified remotes 102/104 will respond.) The base station 103 then transmits, on the next ATDMA cycle, a Continue-TDMA (CTDMA) control frame with a data type code and remote 102/104 IDs. Each remote 102/104 receives the CTDMA control frame and then transmits its next message or segments of a message in each slot that contains the ID for that remote 102/104.

The base station 103 and remotes 102/104 repeat this process as long as the base station 103 keeps scheduling the ATDMA slots by sending CTDMA frames. Each additional CTDMA frame acknowledges segments from the preceding cycle, indicates a data type for the new cycle, and assigns more remote 102/104 IDs. If a Remote 102/104 runs out of messages to send while the base station 103 is still in the ATDMA mode, that remote responds to the CTDMA frames with empty STDMA messages.

Additionally, a base station 103 in ATDMA mode schedules randomly spaced slots for use by unassociated remotes 102/104 to connect to the base station by sending an acquire frame to the base station 103.

The base station 103 stops the ATDMA mode with a reduction in demand from the associated remotes 102/104. Specifically, the base station 103 transmits an ETDMA frame that acknowledges the segments received from the remotes 102/104 from the preceding cycle and instructs the remotes 102/104 to return to CSMA mode.

Figure 3B:
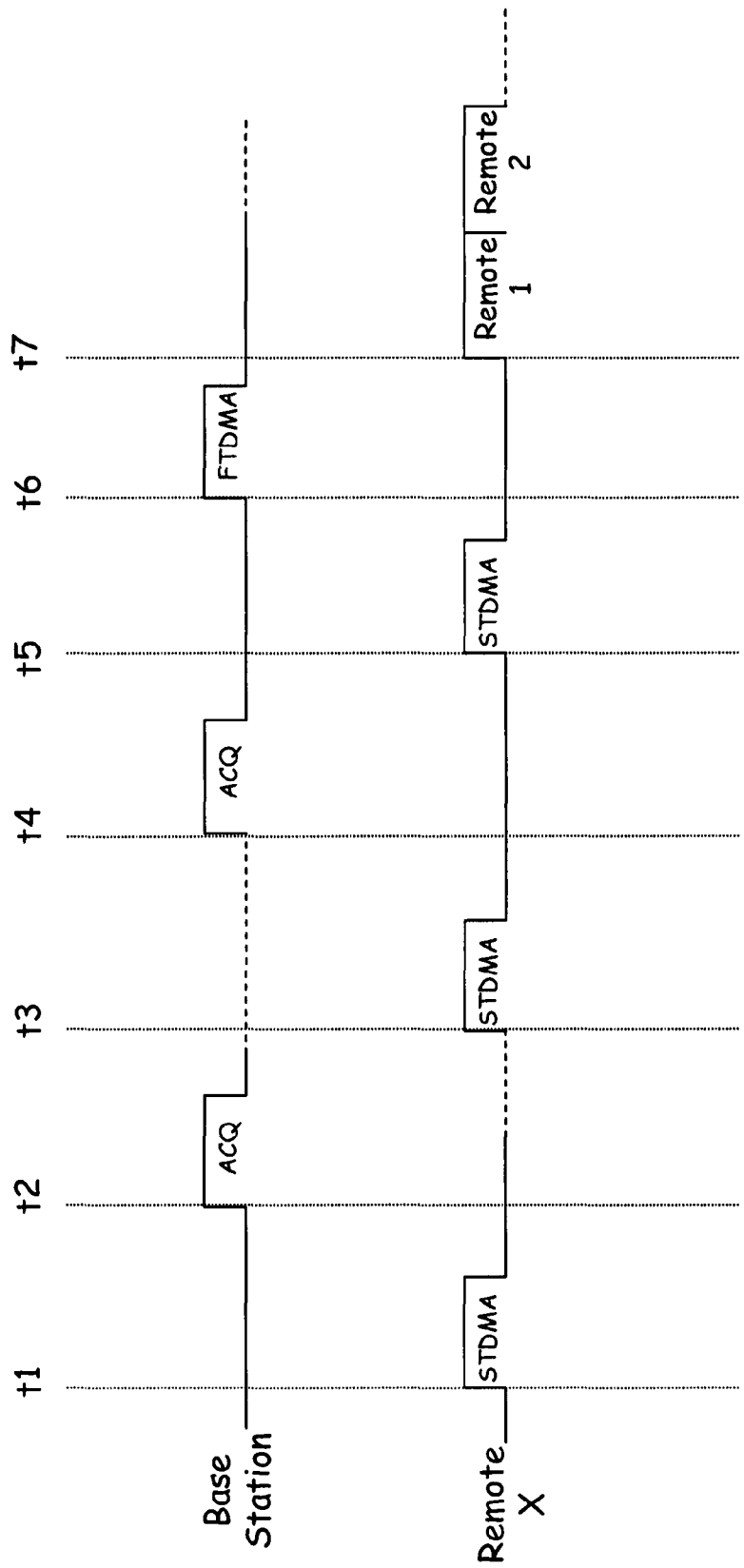
FIGS. 3B and 3C are collectively a timing diagram illustrating a small number of cycles of a system operating in an adaptive time division multiple access (ATDMA) mode according to the principles of the present invention, with FIG. 3B illustrating typical ADTMA operations during low-demand periods and FIG. 3C illustrating typical ADTMA operations during high-demand periods.
Figure 3C:
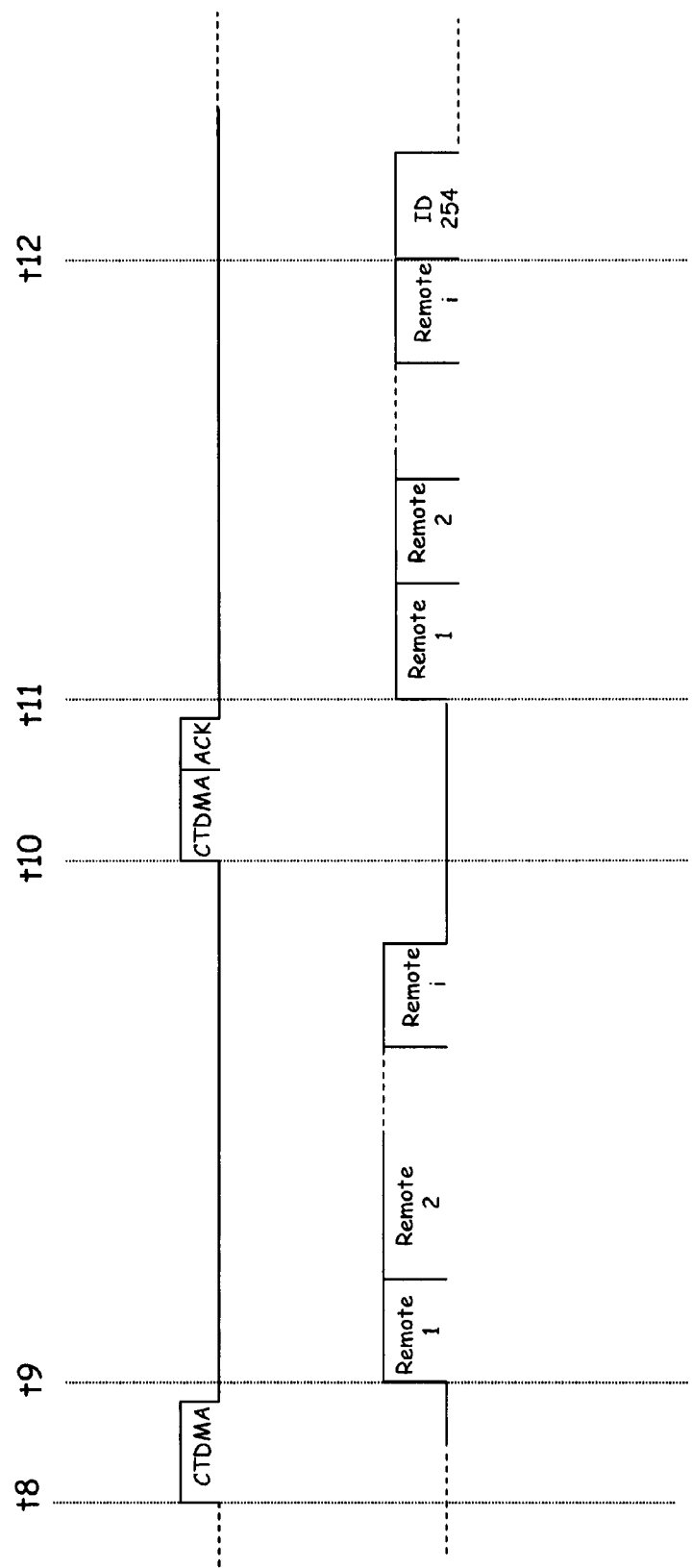

Typical ATDMA communications can be illustrated by the example shown in FIGS. 3B and 3C. At time t1, a remote 102/104, for example Remote X, starts up in CSMA mode with an empty transmit queue (TXQ), selects a base station 103, and sends an empty STDMA message to that base station. Assuming that the base station 103 has no outbound traffic, it sends an acknowledge (ACQ) frame at time t2, associates Remote X as a new neighbor, and adds Remote X to its TDMA schedule. Remote X checks-in periodically with the base station with an STDMA message.

Remote X then receives a message in its TXQ for transmission to the base station 103, for example a 1000 byte message. Remote X therefore sends an STDMA message to the base station at time t3 indicating its TXQ size. The base station 103 computes this load is not enough traffic to warrant switching to the TDMA mode and acknowledges the STDMA message as a normal segment at time t4, and adds the message size in formation into the TDMA schedule. Remote X therefore begins using CSMA message frames to send its 1000 byte message to the base station 103, as discussed above. The base station 103 acknowledges the CSMA message frames received from Remote X and decrements the TXQ size in its TDMA schedule.

Assume that while sending the first message, Remote X receives 50 more messages to be transmitted to the base station. Remote X sends a new STDMA message via CSMA with its TXQ counts, at time t5. In this case, the base station 103 determines that the load warrants TDMA mode operation. Base station 103 therefore builds a new schedule for all current traffic (both inbound and outbound) with all the associated remotes 102/104 and broadcasts a FTDMA message, at time t6. The remotes 102/104 begin to transmit in their assigned slots at time t7, The base station 103 then sends the first CTDMA frame, at time t8, with the remote 102/104 IDs from its TDMA schedule. In turn, the remotes 102/104 (in this example, i number of remotes are assumed), including Remote X, receive their IDs and transmit message segments in the corresponding slots, starting at time t9. This process of the base station 103 sending CTDMA control frames with IDs and the remotes 102/104 transmitting in the corresponding assigned slot continues until the base station 103 sends an ETDMA frame.

At the start of each ATDMA cycle, base station 103 acknowledges within the new CTDMA control frame the transmissions from each of the remotes from the previous cycle (e.g. within the CTDMA control frame beginning at time t10). Furthermore, periodically base station 103 inserts a broadcast (i.e. ID 254) slot into the ATDMA cycle to allow additional remotes 102/104 to join the system using CSMA (e.g. at time t12).

In one alternate embodiment of the present inventive principles, suitable for implementation with multiple channel SDR 200, a TDMA scheme is implemented on one frequency, $f_1$, for organized transmission of periodic priority data, voice, and non-priority data, while a CSMA scheme is used on another frequency, $f_2$, for the transmission of unsolicited messages.

Advantageously, this alternate embodiment allows the high speed channel on frequency f1 to be fully organized for maximum efficiency and greatly reduces the risk of CSMA RF collisions that might occur when the times or number of slots available for CMSA transmission are limited by the traffic load. In the case of a railroad application, the second channel on frequency $f_2$, may be used to announce unsolicited wayside aspect changes and other critical information. This feature not only allows these short packets to be quickly transmitted to the base stations using CSMA, but also affords the locomotive radios an excellent opportunity to intercept the packets to get the aspect change onboard as soon as possible.

While the principles of the present invention are generally applicable to a wide range of wireless communications systems, one particular application is in railroad communications system 100 described in FIG. 1. The following discussion describes this particular application in additional detail.

In railroad communications system 100, a number of different types of messages are exchanged between base stations 103, locomotives 102, and wayside subsystems 104. The following discussion describes one particular set of messages suitable for use in railroad communications system 100, although message type and structure may vary from embodiment to embodiment.

A Generic Message packet includes a 5 byte preamble (e.g. synchronization and correlation bytes), a 18-30 byte overhead field (e.g., a data header, FEC bytes, and CRCC bytes), and 14-140 binary bytes of the message. If the message is longer than 140 bytes, it continues in the next message packet, which is transmitted as soon as the destination acknowledges the receipt of the current packet.

The header information allows very large, multiple-packet messages to be routed anywhere in the network; however, most data inbound to a base station 103 comprise shorter (<500 bytes) messages destined for central office 101. These messages can be sent in much more efficient "Host Message Packets" that are automatically sent to central office 101 for source routing, and hence require smaller overhead fields.

A voice packet includes a 5 byte preamble, a 5 byte header, and 41 bytes of digitized voice. The 41 bytes of voice data contain 107 ms of digital voice (e.g. 257 bits plus 64 bits FEC and other control bits). Each voice packet can be processed "stand-alone" or chained with as many packets as necessary to produce a continuous voice stream. Voice transmission is discussed in further detail below.

A Poll Packet is defined as a preamble, a header, a list of addresses of remotes 102/104 being polled, security bytes, FEC information, and CRCC bytes. The header contains information as to the type of poll and the size of each poll response frame. The maximum number of sites polled per frame is determined by the size of the response frame, as sized to fit in an 94.4 ms window, which in the illustrated embodiment corresponds to ten waysides, or six locomotives.

When waysides are polled for status or current aspect information, they respond in their assigned response slot with a Wayside Poll Response Packet, which includes a preamble, a header, status or aspect information, security bytes, FEC information, and CRCC bytes. In the illustrated embodiment of system 100, all waysides are polled once every six seconds by the associated base station 103. The aspect information field is defined as 40 bits, which provides five bits per aspect control element (e.g. signal lamp) such that sites with up to eight control elements can be covered by a single Wayside Poll Response Packet. Sites with more than eight control elements register as "extended sites" and are allocated multiple polling slots for response. The illustrated embodiment supports extended sites with a maximum of 40 control elements per site, or 200 bits.

When locomotives are polled by the associated base station 103 for current position information, they respond in their assigned response slot with a Locomotive Poll Response Packet, which is defined as a preamble, a header, position information, security bytes, FEC information, and CRCC bytes. In the illustrated embodiment, all locomotives are polled for position once every 15 to 120 seconds, depending on their speed. For example, a locomotive traveling 59 mph will be polled every 15 seconds; a stopped locomotive will be polled every 120 seconds.

An unsolicited wayside packet is defined as a preamble, a header, status or aspect information, security bytes, FEC information and CRCC bytes.

As discussed above, a separate channel on frequency f2 may be used to allow remote 102/104s 102/104 to transmit unsolicited packets to the associated base station 103 in a single-channel radio system. Unsolicited packets can be transmitted from a remote 102/104 to a base on $f_2$ anytime the base is not transmitting. In a multiple channel radio system, such as SDR 200, unsolicited messages may be received on f2, while other data are being received on $f_1$.

Whenever a wayside subsystem 104 detects a status or aspect change, it notifies the base station 103 immediately by transmitting the change on $f_2$ as an unsolicited CSMA packet. This feature realizes significant benefits, as briefly discussed above. Among other things, the information is sent the associated base station 103 and on to central office 101 immediately without waiting for an assigned TDMA slot. Additionally, any nearby locomotives 102 can intercept the packet and gain knowledge of the change without waiting for the associated base station 103 to relay the information. (Since aspect changes are required to be delivered to each locomotive 102, base stations 103 relay the change in an accountable manner using Push-Poll packets; however, most locomotives 102 will have already received the information directly, so relay information typically represents become a conformation step.)

The push-poll packet is defined as a preamble, a header, an address list, an encapsulated header and aspect information, security bytes, FEC information and CRCC bytes. The address list addresses all locomotives currently communicating with the base station 103 and instructs those locomotives 102 to respond with an ACK (acknowledge) packet in their assigned slot to verify that they have received the data. Thus, relayed data are typically only transmitted once, rather than once to each locomotive. Any locomotive does not respond with an ACK packet, the packet is re-sent addressing only non-responding locomotives.

The locomotive acknowledge (ACK) packet includes a preamble, a header, security bytes, FEC information, and CRCC bytes. The header indicates that this packet is an ACK of the just received wayside information.

Each ATDMA cycle is controlled by a ATDMA control frame at the start of the cycle. A remote 102/104 can only make a transmission that matches the frame type of the current cycle, as defined by the ATDMA control frame. TABLE 1 lists the preferred control frames for the railroad example:

| Type | Description | Slot Width (bytes) |
| --- | --- | --- |
| ETDMA | End TDMA - ends TDMA mode and starts CSMA mode | None |
| POS | Position reports | 45 |
| POSS | Position with status reports | 48 |
| SEGB | Message segments frames addressed to the base | 90 |
| SEGP | Message segment frames addressed to a peer remote | 110 |
| DAT | SDATA reports | 60 |
| WSP-1 | Wayside status poll and response frames<br>Poll = 31 bytes<br>Response = 75 bytes (max of 10 control points)<br>Guard time = 4 bytes | 86 |
| WSP-2 | Wayside status poll and response frames<br>Poll = 31 bytes<br>Response = 75 bytes (max of 20 control points)<br>Guard time = 4 bytes | 106 |
| WSP-3 | Wayside status poll and response frames<br>Poll = 31 bytes<br>Response = 75 bytes (max of 30 control points)<br>Guard time = 4 bytes | 126 |
| WSP-4 | Wayside status poll and response frames<br>Poll = 31 bytes<br>Response = 75 bytes (max of 40 control points)<br>Guard time = 4 bytes | 146 |
| STAT | Request STDMA frame from addressed remotes | 45 |

Figures 3D, 3E:
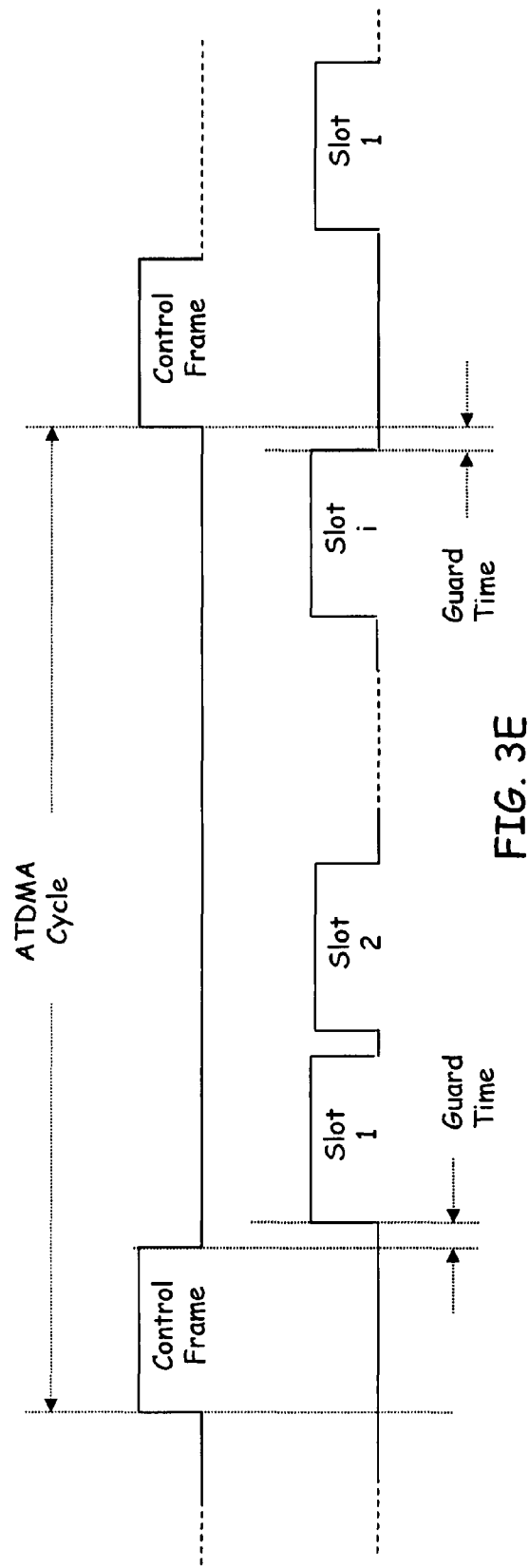
FIG. 3D is a diagram of a representative (position reporting) control frame transmitted at the start of an ATDMA cycle and defining the following time slots in the cycle.
FIG. 3E is a timing diagram of a generic ADTMA cycle according to the principles of the present invention.

The FTDMA and CTDMA frames discussed above are not, in themselves, frame types but are whatever frame type, taken for example from Table 1, required to define the next ATDMA cycle. For example: the FTDMA or CDTMA frame could be a POS, POSS, SEGB, SEGP, DAT, or WSP depending of what the base station scheduler requires. Generally, each ATDMA control frame transmitted by the associated base station 103 contains a type code, Base ID, sequence number, slot count, ACK bits and list of 1 to i ID codes as shown in FIG. 3D for position reports. The given control frame may vary in length, depending on the number i of remotes being assigned transmission slots.

The application of the principles of the present invention is independent of specific timing relationships; however, exemplary times are discussed below for the preferred embodiment of railroad communications system 100. Furthermore, it is also assumed in this example that at least one slot in each TDMA cycle is reserved for voice communications, although this is also not a requirement for practicing the inventive principles. A preferred generic slot timing is shown in FIG. 3E; TDMA cycle length and slot width may differ depending on the data being transmitted, the type of TDMA cycle defined by the ADTMA control frame, as well as the particular application.

Preferably, base stations 103 and remotes 102/104 are provided with Global Positioning System (GPS) receivers which allow system synchronization to one microsecond accuracy. Remotes 102/104 without GPS receivers time synchronize to the base station status frames discussed below.

In the present example, the RF link data rate is 38.4 kbps and each TDMA cycle (i.e. the time between the start of each control frame) is 107 ms in length, with one 12.6 ms slot of each cycle reserved for voice communications, and the remaining 94.4 ms per cycle available for other communications (e.g. data). Each 94.4 ms period then contains 453 raw bytes which may be allocated as inbound or outbound data, polls, poll responses, or CSMA slots. In the illustrated embodiment, a maximum of three 112 byte message packets or five 56 byte message packets can be exchanged in a 94.4 msec portion of the TDMA cycle. If a message requires more time, it can be continued in the next TDMA cycle immediately following the voice slot, or at a later time, as controlled by the base station 103.

The given base station 103 may reserve a first transmission slot (i.e. the first slot after the control frame) of every TDMA cycle for itself, for example, for transmitting data, a poll, control, or a status frame. Status frames identify the base station 103, indicate whether the voice slots are active, and provide link status information. In the illustrated embodiment, base station 103 typically reserves the first 20 ms of the transmission first slot of each ATDMA cycle for itself.

Once every two minutes each base station 103 broadcasts its own location in a status frame, such that a remote searching for a base station 103 can always find all neighboring base stations 103 in the coverage area by listening at this instance. In the illustrated embodiment, in which all base stations 103 within railroad communications system 100 transmit location information at substantially the same time, and multiple channel SDRs 200 are used, each remote 102/104 can listen simultaneously to up to four base station channels to identify surrounding base stations 103.

The actual amount of data exchanged in any given cycle varies as a function of the number of times the link must be turned around and the overhead required on each turn-around. Moreover, the number of TDMA cycles used for polling will vary with load. For instance, wayside polls may be performed over one or two ATDMA cycles every six seconds, while locomotive position polls may only require one cycle every 15 to 120 seconds.

In the present example, to deliver a typical 100 byte outbound message, the base station 103 transmits the first 56 byte packet in a selected slot, waits for the ACK packet from the remote 102/104, transmits the second packet, waits for another ACK, then finishes. This process takes about 65 ms. If the base station 103 fails to receive an ACK, it repeats transmission of the packet at the next opportunity.

Non-periodic inbound data is preferably done by reservation using an STDMA packet. Remotes 102/104 may request inbound slots during any normal response to the base station

103, during CSMA slots (either on $f_1$ or $f_2$), or during base status polls of its remote 102/104, which will normally occur every few seconds.

In the present example, in which the RF link data rate is 38.4 kbps, voice transmissions are performed as follows. Generally, either a dispatcher in central office 101 or a field person (e.g. a train crew on a locomotive 102) initiates a conversation at any time by listening for quiet time on the voice channel, keying their microphone, and then talking (i.e. push-to-talk or PTT).

As indicated above, a 12.6 ms slot is dedicated every 107 ms to carry digitized voice. Voice is encoded at 2400 bps and, with FEC and other control bits added, such that a 3000 bps data steam is generated. Once the microphone has been keyed, the local voice sampler immediately begin sampling and encoding voice. As soon as the first 12.6 ms voice slot becomes available, those samples are pulled off and packetized for transmission. In the present example, a full packet will contain 321 bits (41 bytes), which may contain leading null data up to the point the talking actually starts to allow a contiguous stream on the receive side.

The voice packet is then transmitted in the reserved voice slot. All radios, either at a base station 103 or a remote 102/104, that receive the packet decode the voice data and output the resulting voice audio. By the time the current packet is decoded, the next voice packet has been received, tagging on another 107 ms of voice data. In other words, each packet of voice data generates 107 ms of voice audio. All packets except the first and last are full; the first packet may have a delayed start and the last packet may have an early completion.

The 12.6 ms RF voice slots are bi-directional, i.e., each slot can carry voice either inbound to the given radio or outbound from the given radio. (Although there is a slight chance of voice collision if transmissions in both directions start in the same 107 ms slot. Otherwise, the voice slots will become busy and prevent another conversation from starting.) The base station 103, as controller of the total RF link, marks the voice link busy in its status packet whenever it is transmitting voice or detects another voice transmission from a remote 102/104 or another base station 103. This feature prevents a remote 102/104 from continuing to step in on a base station 103 voice transmission, and prevent a non-hearing remote 102/104 from stepping in on an in-progress transmission from another remote 102/104.

A base station 103 can control data transmissions as organized priority data or non-priority data in the ATDMA mode. For example, messages may be transmitted using full preemptive prioritization. In this case, every message is assigned a priority of A-Z (A=Highest), when it is entered into communications system 100, for example by a host processor 215 of a multiple channel SDR 200. This priority tag travels with the message and is used by each node handling the message for priority queuing. Since the process is preemptive, a high priority message will interrupt a lower priority message that is currently being transmitted, such that a high priority message will be delivered first. After transmission of the higher priority message, a lower priority message that has been interrupted continues from the point it was interrupted. For example, if a remote 102/104 radio is half way through transmitting a 20,000 character log when a higher priority 500 character status message is entered, that radio will discontinue sending the log, send the status report, then resume sending the log from the half way point.

Non-priority data transmission is organized by the base station 103, such that when the channel is not fully utilized by the priority data traffic, the base station 103 can allocate some TDMA slots for non-priority data transmission. Additionally, if a given radio has a priority data message to transmit while other radios in the area are offering non-priority traffic to the network, the base station 103 can allocate time slots, which would otherwise be used to service the non-priority traffic, to the priority data traffic in the next TDMA cycle. Advantageously, the delay of the first transmission attempt of the priority message is less than the length of one TDMA cycle.

In the illustrated embodiment, remotes 102/104 can be setup manually to connect to specific base stations 103, or can be placed in Auto mode where they will choose their own base stations 103 to communicate with.

Generally, in the Auto mode, several parameters are computed by each remote 102/104 for each base station 103, repeater, and other remote 102/104 within the coverage area. These parameters are then periodically scanned to determine if the remote 102/104 should stay with the current associated base station 103 (e.g. master), or switch to another base station 103. When multiple channel SDRs 200 are used, a remote 102/104 is able to monitor base stations 103 on each channel. The remote 102/104 transmitter is set to the same channel as the base station 103 by default, and can be switched to other channels depending on the system requirements.

In the illustrated embodiment, a remote 102/104 observes the following parameters for each neighbor node (i.e. base station):

| | |
|---|---|
| RXCNT | Number of frames received |
| TXCNT | Number of transmits with no ACK |
| DTRF | Detected RF (RSSI) |
| DIST | GPS distance from this node |
| Unit Type | Base, Repeater or Remote 102/104 |
| NUP | Minimum Neighbor up frame count |
| NDOWN | Neighbor Down |
| T/A | Transmit/ACK threshold |
| RR | Remote 102/104 Relay ON-OFF |

Based on the current state of these parameters, the remote 102/104 determines whether a change in base station 103 is required, based on the following selection rules:

1. If the transmit to ACK ratio is below T/A, keep current master if it is a base station 103 or a repeater, unless there is another base station 103 or repeater that is 20% closer;
2. If current master is a remote 102/104-relay, and if transmit to ACK ratio is below T/A, scan for new master at the top of each minute;
3. If transmit to ACK ratio is at or above T/A scan for new master every 5 seconds;
4. Skip nodes farther than 100 miles away;
5. Skip nodes with DETRF less than −100 db;
6. Favor a Base station 103 over a Repeater and a Repeater over a Remote 102/104-Relay;
7. Only use Remote 102/104-Relay if RR is ON;
8. Only consider radios with RXCNT above the NUP value;
9. Choose Base station 103 with highest DTRF except if within 3 miles;
10. If current base station 103 is offline, don't select it again unless it is the only base station 103 available;
11. If distance to Base station 103 is known, choose Base with shortest distance; and
12. If distances are known, change to new base station 103 if it is 20% closer than the current base station 103.

Once a remote 102/104 selects a base station 103 to associate with, it must switch its transmitter to that base station's channel and transmit an ACQ frame to signal the base the desire to form an association with that base station 103.

In particular, if the base station 103 to which the remote 102/104 is attempting to associate is in the ATDMA mode, then the remote 102/104 must wait to receive a CTDMA frame with a broadcast slot (e.g. ID 254), and transmit the ACQ frame in that slot. In the present example, an ATDMA slot is provided for this purpose at least once every second. All remotes 102/104 that are not associated with the base station 103, but are attempting to associate, must compete for this slot in the CSMA mode. If the remote 102/104 fails to associate with the base station 103, it must pick a random back-off count from 1 to 5 and try again when that number of broadcast (ID) slots has been received. When the base station 103 receives the ACQ frame, it schedules an outbound ACQ to the remote 102/104 in the next cycle. The remote 102/104 receives this ACQ and change its mode from CSMA to ATDMA.

Each position (POS) report indicates its required update interval. STDMA frames are used to reserve slots for all other message transmit requirements except for any responses a given remote 102/104 must make in response to transmissions from the associated base station 103. In this case, the base station 103 provides slots for remote 102/104 response frames and acknowledgements.

A Transmit Status Block (TSB), shown in FIG. 3F, is maintained by each remote 102/104, and characterizes the state of the remote 102/104 transmit queue (TXQ). When a remote 102/104 powers-up, its transmit queue is empty, and the TXQ is cleared. Each time a message is routed to the associated base station 103 from the remote 102/104, the TXQ is updated. The TXQ maintains a summary of the message types transmitted (e.g. number of wayside status requests and their update interval, the number of SDATA reports, and the number of binary message segments and total length for each type of message.

With each update, the remote 102/104 determines whether a new update message must be sent to the base station 103. In the illustrated embodiment, if the transmit queue empties, or changes in size by 10% or more, an update will be sent. The priority of the update message is higher than any application message such that it will be sent to the base station 103 as soon as possible. When a new status message is queued, any older status messages are first deleted, such that only the latest status message remains in the queue.

In the illustrated embodiment, all timing is synchronized on the last bit of the base station control frames, with each new control frame re-synchronizing the slots assigned to each remote 102/104 to within +/− one half milliseconds for the duration of the current ATDMA cycle. (GPS receivers, when installed, are used for time synchronization and for interleaving ATDMA cycles between neighbor base stations 103.)

In the illustrated embodiment, a 2 millisecond guard time is provided between slots within a given TDMA cycle, which allows the radio power amplifier corresponding to one slot to ramp down to zero, and the power amplifier corresponding to the next slot to ramp up to full power, as well as accounts for any software related multitasking and timing jitter.

When a remote 102/104 receives an ATDMA control frame and determines that it must transmit, for example in slot-3, that remote 102/104 first calculates the number of bytes from the trailing edge of the ATDMA control frame to the start of slot-3. This is preferably done using a table that translates the frame-type into its byte length. The number of bytes is then converted into a bit count. This count is divided by the bit rate and converted into milliseconds. (The SDR 200 operating system provides a 1 millisecond clock for delay timing which allows the remote 102/104 to wait for the exact millisecond count to start its transmission.)

While the remote 102/104 is waiting for the start of its slot, it can receive data from all the slots that are used by other radios.

When an associated remote 102/104 has a high priority message to transmit it must wait for an ATDMA control frame with its ID in one or more slots, or for a slot assigned to ID 254, whichever is received first. When a remote 102/104 identifies a slot it can use from the control frame, the remote 102/104 waits for the beginning of that slot then transmits one frame of data that is appropriate for the defined slot data type.

If the slot was addressed to its ID, the remote 102/104 waits for an ACK bit in the next ATDMA control frame. If the ACK bit is set, the data transmitted were acknowledged and can be discarded at the remote. If the ACK bit is zero, the data were not received by the base station 103 and must be retransmitted in the next slot available for the remote 102/104. Since the remote 102/104 used an addressed slot, the back-off counter must be set to zero.

On the other hand, if the first available slot was a broadcast slot, the remote 102/104 must wait for an ACK frame in the next cycle before it can determine if the frame did not collide with a transmission from another remote 102/104. The remote 102/104 must therefore select a random number from 1 to 5 to use as a back-off counter in case it is not acknowledged in the next ATDMA cycle. Each time the remote 102/104 identifies a broadcast slot thereafter, the back-off counter is decremented. Once the back-off counter reaches zero, the remote 102/104 re-transmits in the broadcast slot and selects a new random back-off count, in case the re-transmission is also unsuccessful. This process repeats until the remote 102/104 receives an ACK for its slot, at which time the remote 102/104 zeros the back-off counter.

When an associated remote 102/104 has low priority messages to transmit, it must wait for an ATDMA control frame with its ID in one or more slots. In the illustrated embodiment, a remote 102/104 cannot use the broadcast slots for transmitting low priority messaging.

In particular, a remote 102/104 having a low priority message to send starts a timer at the beginning of its assigned slot then transmits one frame of data that is appropriate for the slot data type. If the remote 102/104 has no more data for that type, it transmits a STDMA status frame instead. The remote may have several slots in any ATDMA cycle, and preferably transmits some information in each of its assigned slots. The control frame at the start of the next cycle has ACK flag bits for each slot that has data addressed to the base station 103.

The embodiments of the principles of the present invention also provide for the establishment of peer-to-peer communications between nodes. In railroad system 100, for example, three kinds of peer-to-peer communications are utilized, namely, locomotives 102 polling wayside subsystems 104 for status, remote-to-remote messaging, and base station to remote segment transmission. Generally, the method of transmission is similar, but different types of ATDMA cycles are used to optimize the timing.

Figure 3G:
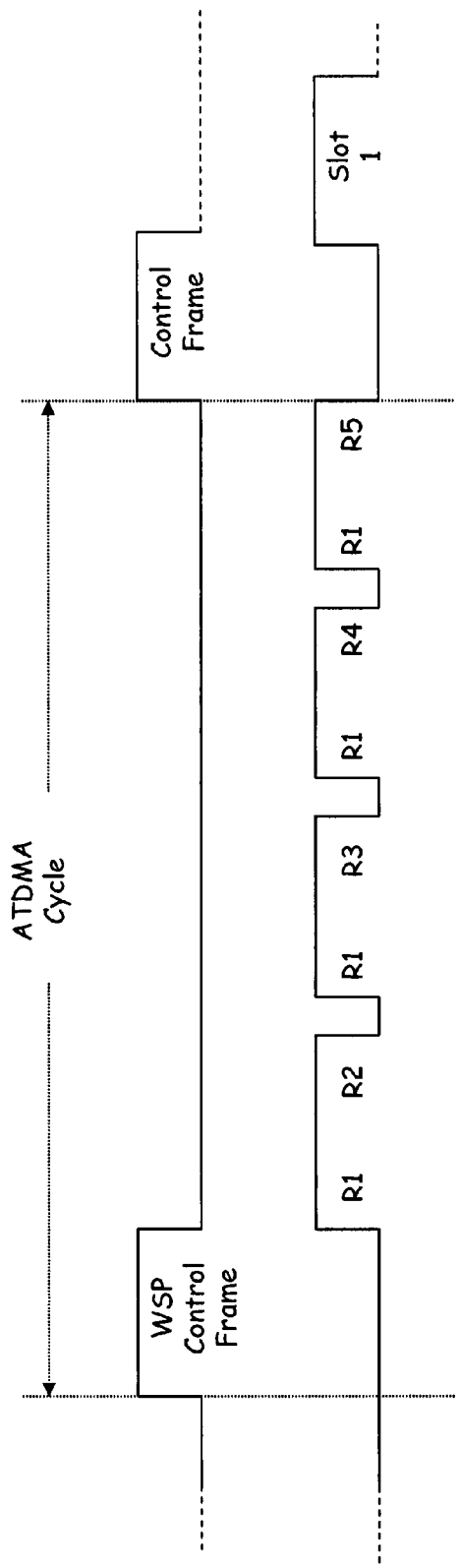
FIG. 3G is a timing diagram illustrating a representative wayside polling (WSP) ATDMA cycle according to the inventive principles.

A typical wayside polling status operation is illustrated in FIG. 3G, in which a remote R1, for example a locomotive 102, has requested a wayside poll for four other remotes R2-R5, for example four (4) wayside subsystems 103. The controlling base station 103 has assigned four (4) slots long enough for a poll from remote R1 and a response from each remote R2-R5 in the cycle between wayside poll (WSP) control frames. (The slot type shown is WSP-1 for a control element wayside response.)

Figure 3H:
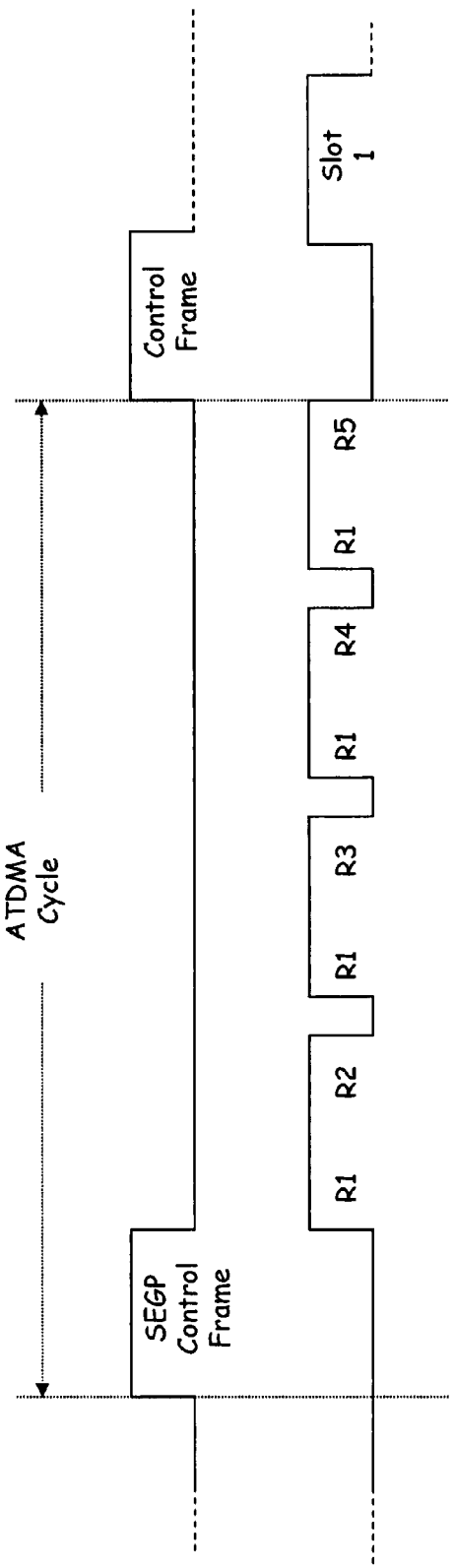
FIG. 3H is a timing diagram illustrating a representative remote radio to peer remote radio (SEGP) ATDMA cycle according to the inventive principles.

FIG. 3H illustrates a typical peer-to-peer messaging operation. In this case, remote R1 is sending message segments to four (4) remotes in four (4) slots in the overall SEGP slot defined between two SEGP control frames. For each message segment, each receiving remote (e.g. remotes R2-R5) returns and ACK or NAK in the same slot.

Figure 3I:
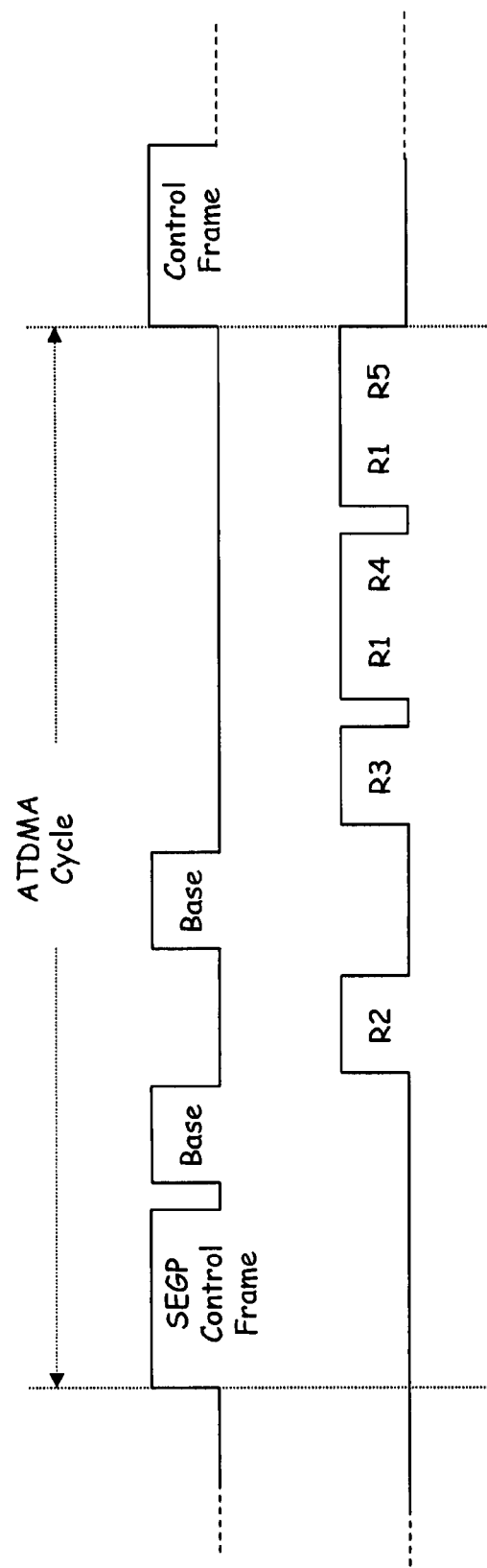
FIG. 3I is a timing diagram illustrating a representative combination base station to remote radio system and remote radio system to peer remote radio system ATDMA cycle according to the inventive principles.

A representative base to remote outbound messaging operation is shown in FIG. 3I, in which a base station 103 is sending message segments to remotes to R2 and R3 while remote R1 is sending a message segment to remotes R4 and R5.

Figure 3J:
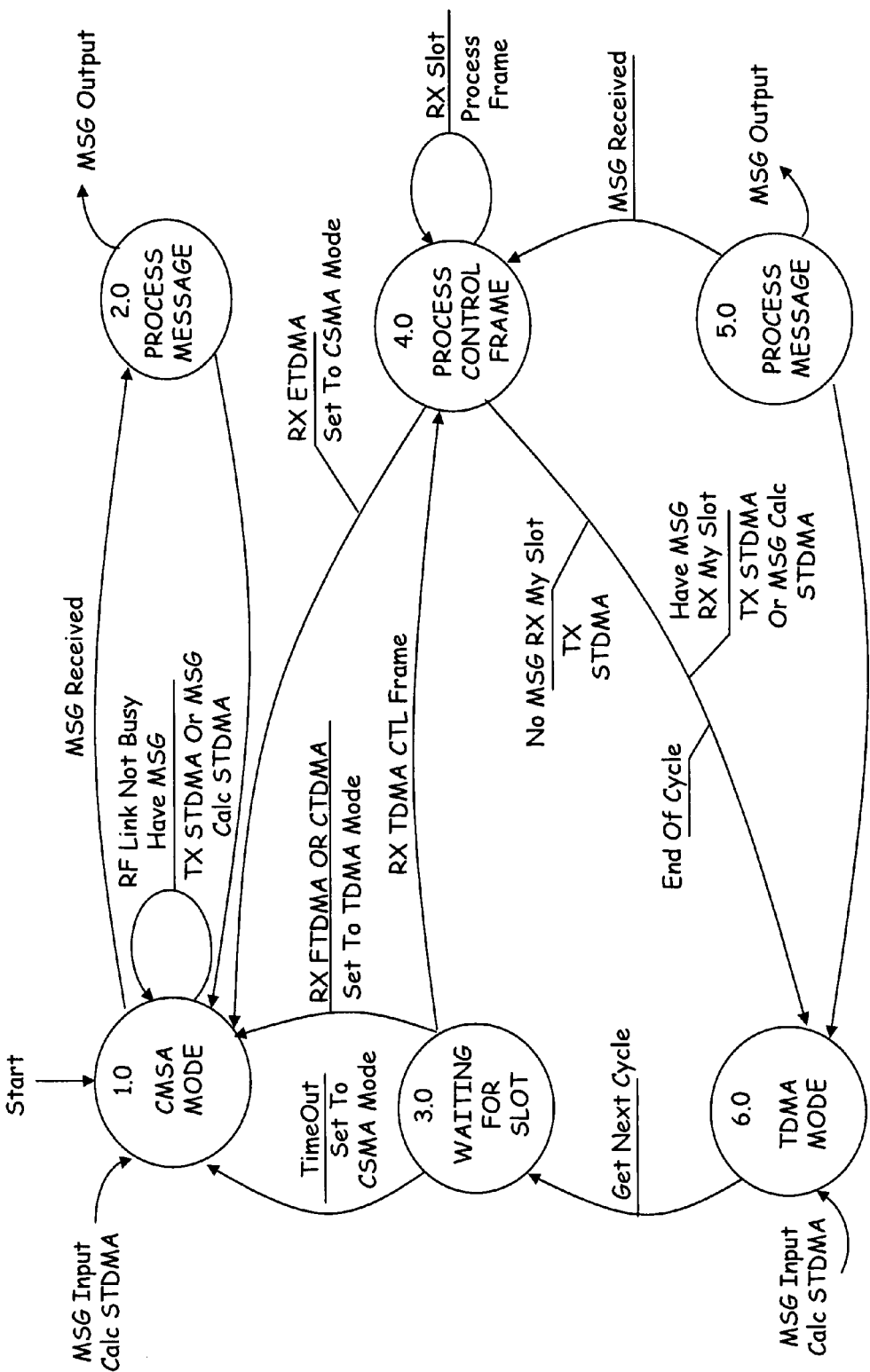
FIG. 3J is a state diagram generally illustrating the overall operating of an ADTMA system embodying the inventive principles.

FIG. 3J is a state diagram illustrates a preferred procedure in which remote 102/104 adapts to the RF Link state set up by the controlling base station 103 on power-up. (The controlling base station 103 can be in either the TDMA or the CSMA mode on remote start-up).

After start-up, the remote 102/104 establishes connectivity with a base station 103 using the CSMA Mode 1.0, as described above. If the remote 102/104 does not receive any ATDMA control frames from the controlling base station 103, it stays in CSMA mode, waits for a free RF Link, transmits its frames to the base station 103, and then re-calculates its STDMA status for each message input or acknowledged. Messages received go to state 2.0 Process Message and are either processed locally (remote commands) or output to a host port. After each message is processed, the state returns back to state 1.0 CSMA Mode.

Each time the remote 102/104 is ready to transmit, and the STDMA status has changed by 25%, a SDTMA message is sent; otherwise message segments or frames are sent as the RF Link permits. If any ATDMA control frames (including POS polls) are received from the base station 103, the remote 102/104 holds off CSMA transmissions, sets to the ATDMA mode, and transitions to state 3.0 Waiting for Slot.

Several kinds of message frames are processed in Process Message State 2.0, including POS reports, remote commands, wayside polls and responses, time-of-day updates, and message segments. Message segments are assembled into full messages, an ETE is generated to the message originator and the message is output to a host port. Completion of actions at this state always causes a return back to state 1.0 CSMA Mode.

While in state 3.0 Waiting for Slot, if the remote 102/104 does not receive a slot for a preset timeout period, or if the remote receives an ETDMA frame, the process returns to state 1.0 CSMA Mode. Otherwise, if the remote 102/104 receives an ATDMA control frame, the process goes to state 4.0 Process Control Frame. All the slots of each ATDMA cycle are handled, after which the process goes to either state 5.0 Process Message or state 6.0 TDMA Mode and then back to state 3.0 Waiting For Slot before the start of the next cycle.

At state 4.0 Process Control Frame, if the remote 102/104 finds its ID in the control frame as its slot assignment, the remote 102/104 transmits either a STDMA frame or a message frame corresponding to the control frame type, then goes to state 6.0 TDMA Mode. The remote 102/104 calculates a new STDMA status if any message segments are acknowledged by the receiving node. On the other hand, if the control frame is an end-of-cycle type, the remote 102/104 goes to state 6.0 TDMA Mode. All of the slots in the cycle are received and frames addressed to the node (either directly or broadcast) will be processed at state 5.0 Process Message.

Several kinds of message frames are processed in state 5.0 Process Message, including POS reports, remote commands, wayside polls and responses, time-of-day updates and message segments. Message segments are assembled into full messages, an ETE is generated to the message originator and the message is output to a host port. This state always goes to state 6.0 TDMA Mode.

In state 6.0 TDMA Mode, the remote 102/104 stays in ATDMA mode waiting for messages to send and listening for frames to receive. If a message was entered, a new STDMA is calculated. Following any local processing it goes back to state 3.0 Waiting For Slot.

Figure 3K:
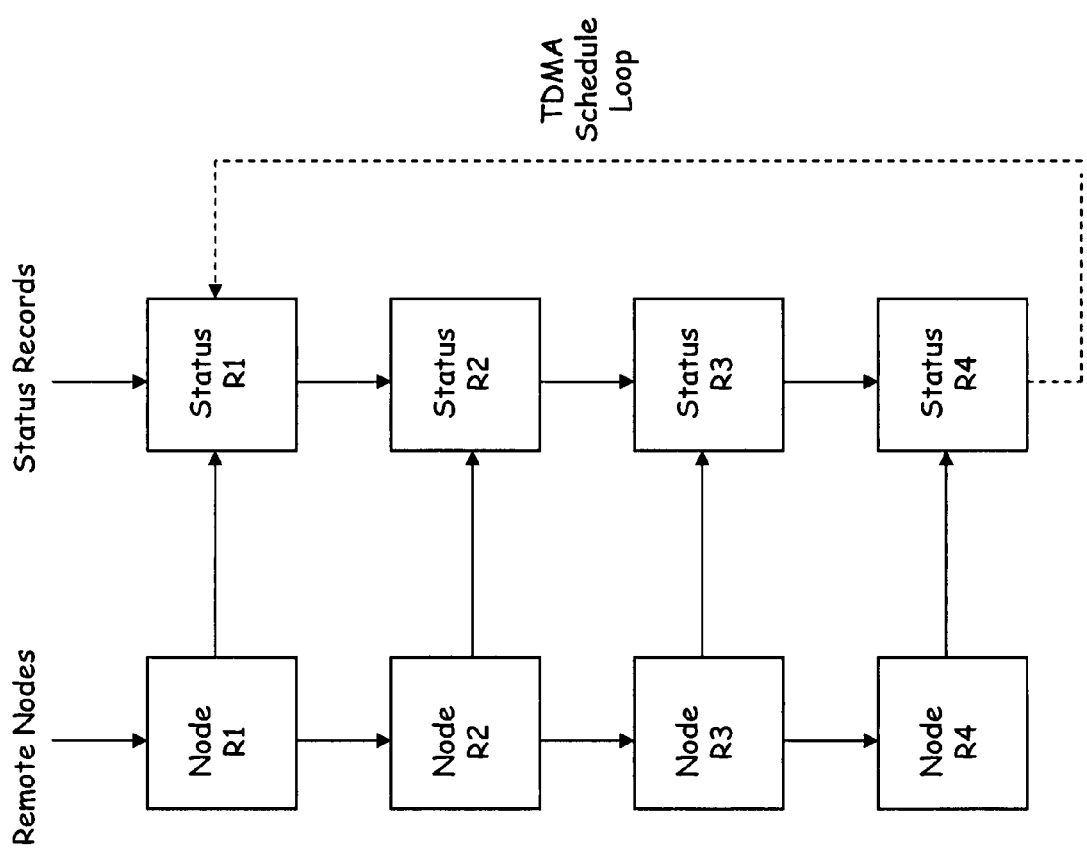
FIG. 3K is diagram illustrating linked-lists that are utilized in one embodiment of the inventive principles to track remote radio system status during ATDMA operations.

As each remote 102/104 is associated with the base station 103, a node record is created for the new remote. The node record contains data for managing all communications with each remote. An ATDMA status record will be linked to the node record when its STDMA frame is received, then linked to a chain linking all the status records, as shown in FIG. 3K.

If frames are not received from a remote 102/104 within the specified neighbor-down time, the remote 102/104 is declared offline and its node record and status record are removed from the linked lists. When frames are received and transmitted between the base station 103 and a remote 102/104, the status records are updated to track changes between STDMA updates.

Position polling is performed as follows in the illustrated embodiment. When operating in the CSMA mode, scheduling is performed by the given base station 103 scheduler once a second. Specifically, each second the scheduler decrements the position report interval for each neighbor remote 102/104. When the count reached zero for a given remote 102/104, that remote 102/104 must be polled.

Furthermore, on every 15th second, the scheduler examines node records of each remote 102/104 to determine if the requested POS interval for any remote 102/104 has counted down to the ready-to-poll state. If the count for any remote 102/104 has counted down to zero, the base station 103 constructs an ATDMA control frame with up to ten (10) remote IDs, and the POS interval counters are initialized for the next polling interval. If the base station 103 is in CSMA mode, it waits for a free RF Link, switches to the ATDMA mode, and transmits the control frame. If the base station 103 is already in the ATDMA mode, it schedules the next cycle to be a POS cycle.

Position reports from remotes 102/104 are always addressed to the associated base station 103. Each time a remote 102/104 receives an ATDMA control frame containing its ID, the cycle sequence number is retained and the remote transmits its POS data in the corresponding assigned slot. Each responsive POS slot received by the base station 103 is acknowledged in the next ATDMA control frame ACK-bit field.

When the next ATDMA control frame is received by the base station 103 with a sequence number one greater than the one the remote 102/104 responded to, the remote 102/104 will check the ACK bits to see if its POS report was received by the base station 103. If POS report was acknowledged, then the POS message is deleted by the remote 102/104; otherwise, the POS report is retained for the next cycle and the base station 103 continues to request the POS report until it is correctly received and acknowledged.

Remotes that do not respond to their assigned slots for a preset number of retries are declared offline and dropped from polling lists.

When building an ATDMA control frame, the scheduler passes through the node list for each type of frame in priority order, discussed below. In particular, pointers run the list in a round-robin order between ATDMA cycles. All remotes 102/104 with messages of one type will be scheduled before the next priority level is started, except that if a higher priority message type is found while polling a lower type, the next cycle will jump back to the higher priority type.

A broadcast slot (ID) will be scheduled in any of the frame types at least once a second for use by new remotes or remotes that have critical message segments.

There is a priority order to determine the type of ATDMA cycle to create whenever several types are due at the same time. The priority order for the illustrated railroad embodiment is:

| | |
|---|---|
| 1 | WSP-1, WSP-2, WSP-3, WSP-4 |
| 2 | POS, POSS |
| 3 | SEGB |
| 4 | SEGP |
| 5 | DATA |
| 6 | STAT |

If the base station 103 has no remote to schedule a cycle for, it schedules a cycle of STAT slots where every neighbor remote 102/104 is given a request for its current status. If all neighbor remotes 102/104 are out of messages, or if the total load is below a preset level, the base will transmit an ETDMA frame and go back to CSMA mode.

Multiple base stations 103 may overlap a given coverage area. Hence, neighboring base stations 103 must coordinate their ATDMA cycles to prevent contention. This is implemented, for example, by staggering poll intervals, or by using multiple frequencies.

In single frequency systems railroad communications systems, interleaving is preferably done in groups of three base stations 103, when those are installed along a road or railroad track. In dense areas more than three interleaving intervals may be required.

When multiple frequencies are used, the remote radios are preferably multiple-receiver SDRs, such as SRR 200 described above, with from 1 to 4 receivers defined depending on the number of cells in the interleave pattern. The remotes 102/104 listen on all receiver frequencies to identify neighboring base stations 102/104 and then change their transmit frequencies to match the best base station, as discussed above.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method for exchanging information within a radio communications system, comprising:
   during a period of lower traffic load on the radio communications system, establishing communications between a selected radio system and at least one other radio system of a plurality of radio systems in the radio communications system utilizing a carrier sense multiple access mode, comprising:
   transmitting a control message from selected radio system including transmit queue status information indicating a number of messages ready for transmission by the selected radio system;
   determining with the at least one other radio system, from the transmit queue status information, that a traffic load on the communications system allows carrier sense multiple access communications;
   detecting a quiet period on the radio communications system with the selected radio communications system; and
   transmitting at least one message from the selected radio system in the detected quiet period; and
   during a period of higher traffic load on the radio communications system, establishing communications between the selected radio system and the at least one other radio system utilizing a time division multiple access mode.

2. The method of claim 1, wherein establishing communications between radio systems utilizing a time division multiple access mode comprises:
   transmitting a control message from the selected radio system, the control message including transmit queue status information indicating that the selected radio system has at least one message for transmission on the radio communications system;
   determining from the transmit queue status information with another selected radio system operating as a master that the traffic load on the communications system requires time division multiple access communications;
   transmitting from the another selected radio system acting as the master a control message defining a transmission time window including at least one time slot within the time window for a transmission by the selected radio system; and
   transmitting the least at least one message with the selected radio system during the at least one time slot.

3. The method of claim 2, wherein the selected radio system includes for transmission a message of a selected predefined message type and the method further comprises defining in the time window a slot of a slot type corresponding to the predefined message type.

4. The method of claim 3, wherein the slot is of a slot type for transmitting a message from the selected radio system to the another radio system acting as the master.

5. The method of claim 3, wherein the slot is of a slot type for transmitting a message from the selected radio system to a further radio system operating within the radio communication system.

6. The method of claim 4, wherein the another radio system operating as the master further defines a least one slot within the time window for the further radio system to transmit a responsive message to the selected radio system.

7. The method of claim 2, wherein the selected radio system comprises a remote operating within a selected coverage area and the another radio system comprises an associated base station within the coverage area.

8. The method of claim 1, further comprising establishing carrier sense multiple access mode communications simultaneous with time division multiple access mode communications using corresponding independent radio channels.

9. A radio communications system comprising:
   a base station and an associated set of remote radio systems, wherein the base station is operable to:
   detect a level of communications by selected ones of the base station and the associated remote radios systems in response to transmit queue status information received from the remote radio systems, wherein a transmit queue status message received from a selected remote radio system indicates a number of messages ready for transmission by said selected remote radio system;

establish carrier sense multiple access communications between selected ones of the base station and the remote radio systems when the base station detects a lower level of communications; and establish time division multiple access mode communications between selected ones of the base station and the associated remote radio systems when the base station detects a higher level of communications.

10. The communications system of claim 9, wherein the base station is operable during time division multiple access communications to transmit a control frame of a selected control frame type for defining a cycle including at least one slot for allowing a selected remote radio system to transmit at least a segment of a message of a corresponding message type.

11. The communications system of claim 10, wherein the control frame defines a cycle including at least one slot for allowing the selected remote radio system to transmit voice data.

12. The communications system of claim 10, wherein the control frame defines a cycle including at least one slot for allowing the selected remote radio system to transmit to the base station.

13. The communications system of claim 10, wherein the control frame defines a cycle including at least one slot for allowing the selected remote radio system to transmit to another selected remote radio system.

14. The communications system of claim 13, wherein the control frame further defines the cycle to include at least one other slot allowing the another selected remote radio system to respond to the selected remote radio system.

15. A railroad communications system comprising:

a base station and an associated set of remote radio systems associated with locomotives and wayside subsystems, wherein the base station is operable to:

detect a level of communications by selected ones of the base station and the associated remote radios systems in response to transmit queue status information received from the remote radio systems, wherein a transmit queue status message received from a selected remote radio system indicates a number of messages ready for transmission by said selected remote radio system;

establish carrier sense multiple access communications between selected ones of the base station and the remote radio systems when the base station detects a lower level of communications; and establish time division multiple access mode communications between selected ones of the base station and the associated remote radio systems when the base station detects a higher level of communications.

16. The railroad communications system of claim 15, wherein the base station is operable during time division multiple access communications to transmit a control frame of a selected control frame type for defining a cycle including at least one slot for allowing a selected remote radio system to transmit at least a segment of a message of a corresponding message type.

17. The railroad communications system of claim 16, wherein the control frame comprises a position report control frame defining a cycle including at least one slot for allowing the selected remote radio system to transmit a position report to the base station.

18. The railroad communications system of claim 16, wherein the control frame comprises a base message segment transmission control frame defining a cycle including at least one slot for allowing the selected remote radio system to transmit a message segment to the base station.

19. The railroad communications system of claim 16, wherein the control frame comprises a remote message segment transmission control frame defining a cycle including at least one slot for allowing the selected remote radio system to transmit a message segment to another remote radio system.

20. The railroad communications system of claim 16, wherein the control frame comprises a wayside status poll and response control frame defining a cycle including at least one slot for allowing the selected remote radio system to a selected wayside subsystem and receive a response back from the selected wayside subsystem.

* * * * *